United States Patent [19]

Sakakibara et al.

[11] 4,142,553
[45] Mar. 6, 1979

[54] ELECTROTHERMALLY OPERATED VALVE

[75] Inventors: Naoji Sakakibara, Chiryu; Nobuyuki Hashimoto, Toyota; Norio Shibata, Susono, all of Japan

[73] Assignees: Aisin Seiki Kabushiki Kaisha; Toyota Jidosha Kogyo Kabushiki Kaisha, both of Japan

[21] Appl. No.: 800,023

[22] Filed: May 24, 1977

[30] Foreign Application Priority Data

May 26, 1976 [JP] Japan .................... 51-67216[U]

[51] Int. Cl.² .................. F16K 31/02; F16K 31/04; F03G 7/06
[52] U.S. Cl. .................. 137/625.44; 251/11; 251/75
[58] Field of Search ............ 251/75, 11; 137/625.44; 337/104, 105; 236/48 R, 101 D

[56] References Cited

U.S. PATENT DOCUMENTS

| | | | |
|---|---|---|---|
| 2,266,537 | 12/1941 | Elmer | 236/48 R |
| 2,528,756 | 11/1950 | Käser | 236/48 R |
| 3,327,946 | 6/1967 | Benson | 251/75 |
| 3,521,138 | 7/1970 | Enemark et al. | 337/104 |
| 4,053,136 | 10/1977 | Perl | 251/11 |
| 4,067,539 | 1/1978 | Perl | 251/75 |

*Primary Examiner*—Martin P. Schwadron
*Assistant Examiner*—A. Michael Chambers
*Attorney, Agent, or Firm*—Berman, Aisenberg & Platt

[57] ABSTRACT

An electrothermally operated valve which comprises a housing provided thereon with first and second ports and with a hermetic chamber in communication with the respective ports, a bimetallic element having a stationary end secured to an inner wall of the housing and a movable end, a cut-off valve including a valve body fixed on the movable end of the bimetallic element to co-operate with one of the first and second ports, and a heating coil coupled with the bimetallic element and adapted to be connected with a source of electricity. When the bimetallic element is heated upon energization of the heating coil, deflection of the bimetallic element is assisted by snap action to open the cut-off valve so as to communicate the first and second ports to each other through the hermetic chamber.

2 Claims, 5 Drawing Figures

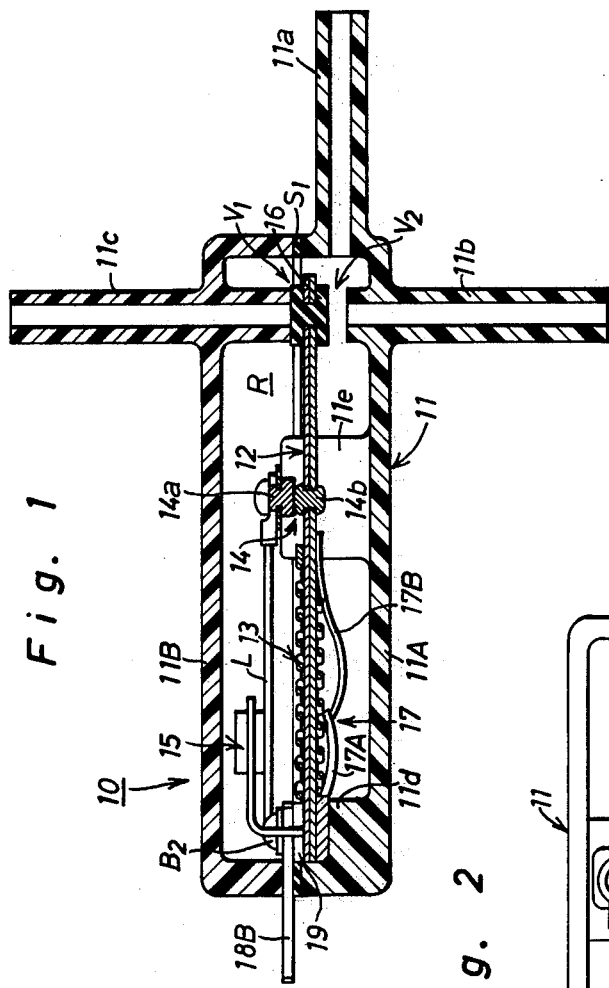
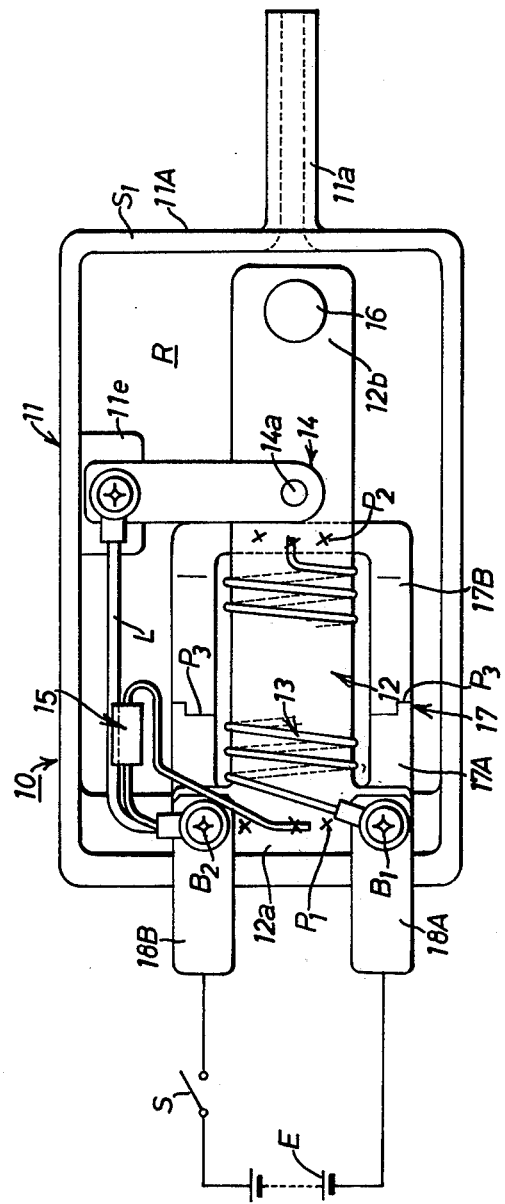

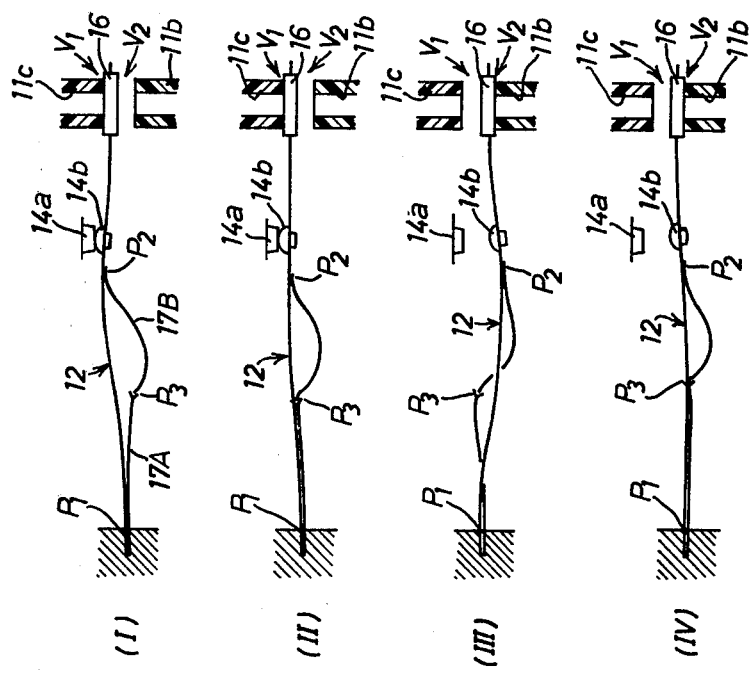
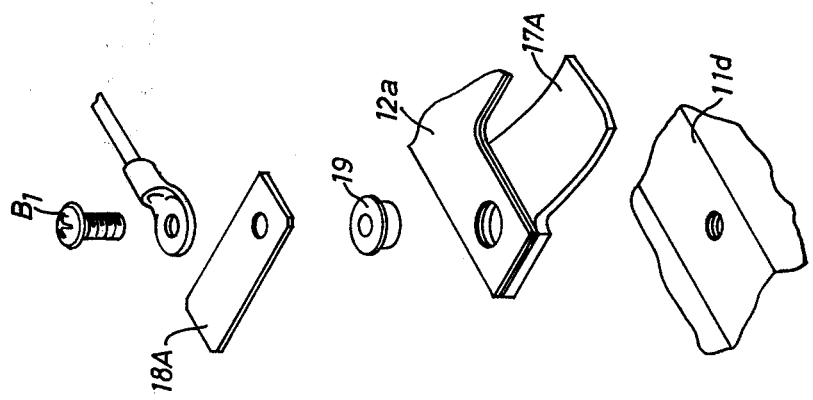

ELECTROTHERMALLY OPERATED VALVE

BACKGROUND OF THE INVENTION

The present invention relates to electrically operated valves controlled in response to an electric signal, and more particularly to an electrothermally operated valve including a bimetallic element to be heated by a heating coil to control the operation of the valve.

In a conventional electromagnetically operated valve, expensive copper wires are used to obtain high response characteristics, and semiconductor elements, such as a switching transistor and the like, are assembled to control the operation of the valve. In practical use the semiconductor elements are occasionally damaged due to a high surge voltage induced upon energization or deenergization of the solenoid windings.

SUMMARY OF THE INVENTION

Accordingly, it is an object of the present invention to provide an electrothermally operated valve which comprises a housing provided with first and second ports and with a hermetic chamber in communication with the respective ports, a bimetallic element having a stationary end secured to an inner wall of the housing and a movable end, a cut-off valve including a valve body fixed on the movable end of the bimetallic element to co-operate with one of the first and second ports, a heating coil coupled with the bimetallic element and adapted to be connected with a source of electricity, and means for providing snap action with the bimetallic element when deflected upon energization or deenergization of the heating coil, whereby when the bimetallic element is heated upon energization of the heating coil, the cut-off valve is opened to communicate the first and second ports to each other through the hermetic chamber of the housing.

BRIEF DESCRIPTION OF THE DRAWINGS

Additional objects and advantages of the present invention will be more readily apparent from the following detailed description of preferred embodiments thereof when taken together with the accompanying drawings in which:

FIG. 1 illustrates a longitudinal cross-section of an electrothermally operated valve according to the present invention;

FIG. 2 is a plan view of the valve shown in FIG. 1, an upper housing of the valve being eliminated in the figure;

FIG. 3 is a perspective view to reveal assembling parts of the valve;

FIG. 4 illustrates the mode of operation of the valve; and

DESCRIPTION OF THE PREFERRED EMBODIMENTS

Figure 5:
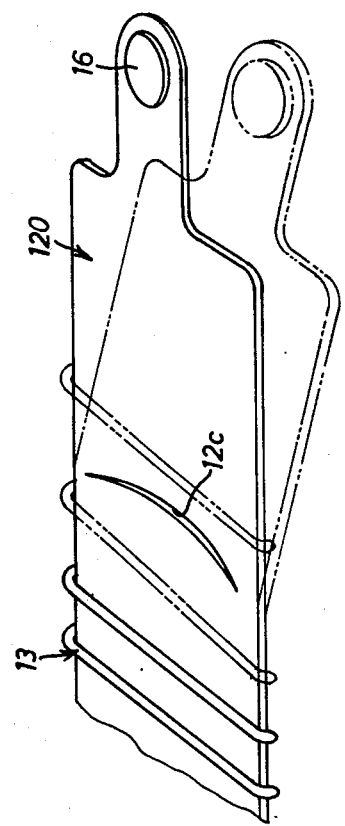
FIG. 5 illustrates a modification of the bimetallic element of the valve.

Referring now to the drawings, particularly to FIGS. 1 and 2, there is illustrated an electrothermally operated valve 10 in accordance with the present invention. The valve 10 includes a housing 11 which is provided therein with a bimetallic element 12, an insulated heating coil 13, a normally closed switch 14 and a resistor 15. The housing 11 comprises lower and upper housings 11A and 11B which are made of insulation materials, such as heat-resistant synthetic resin and the like. These housings 11A and 11B are hermetically coupled to each other by way of an annular seal member $S_1$ to form a hermetic chamber R therein. The lower housing 11A is provided at its right end wall with a first port 11a extending rightward and at its bottom portion with a second port 11b extending downward. The lower housing 11A is further provided at its left inside wall with a first mounting base 11d and at its rear inside wall with a second mounting base 11e. Upper housing 11B is provided with a third port 11c extending upward and opposing the second port 11b of the lower housing 11A.

The bimetallic element 12 comprises a pair of T-shaped metal strips which are secured at their stationary ends 12a on the first mounting base 11d by screws $B_1$ and $B_2$. In this bimetallic element 12, the metal strip having the higher coefficient of thermal expansion is superposed on the upper surface of the metal strip having the lower coefficient of thermal expansion. The bimetallic element 12 is provided at its movable end 12b with a valve body 16 to selectively open and close the second and third ports 11b and 11c. On the left bottom of the bimetallic element 12, a snap-acting member 17 is integrally provided and comprises a U-shaped based spring plate 17A and a U-shaped thin spring plate 17B. The base spring plate 17A is bowed and fixedly mounted at $P_1$ in FIG. 2 on the stationary end 12a of the bimetallic element 12 and the thin spring plate 17B is also bowed and secured at $P_2$ in FIG. 2 on a movable portion of the bimetallic element 12. Legs of these spring plates 17A and 17B are opposingly engaged with each other at $P_3$, as seen in FIG. 2.

The insulated heating coil 13 is wound around the left portion of the bimetallic element 12 and has a right terminal fixed on the upper surface of the bimetallic element 12 and a left terminal clamped on a first input terminal plate 18A by the screw $B_1$. The first input terminal plate 18A is assembled on the stationary end 12a of the bimetallic element 12 by way of an insulator 19, as clearly shown in FIG. 3.

The normally closed switch 14 comprises a fixed contact 14a secured on the second mounting base 11e of the lower housing 11A and a movable contact 14b secured to the movable portion of the bimetallic element 12. The movable contact 14b is electrically connected to the first input terminal 18A across the heating coil 13, while the fixed contact 14a is electrically connected by way of lead wire L to a second input terminal plate 18B which is assembled by the screw $B_2$ in the same manner as the first input terminal 18A. The first input terminal 18A is also connected to the second input terminal 18B by way of a main switch S and a source of electricity E.

The resistor 15 has a predetermined resistance value and is connected at one terminal thereof to the second input terminal 18B and at the other terminal thereof to the stationary end 12a of the bimetallic element 12. Thus, the resistor 15 is electrically arranged in parallel with the normally closed switch 14.

In the electrothermally-operated valve 10 described above, the valve body 16 is adapted to co-operate with a valve seat of the third port 11c to provide a first cut-off valve $V_1$ and to co-operate with a valve seat of the second port 11b to provide a second cut-off valve $V_2$. During deenergization of the heating coil 13, the bimetallic element 12 engages the valve body 16 with the valve seat of the third port 11c by self-biasing force thereof under biasing of the snap acting member 17 to close the first cut-off valve $V_1$ and to open the second cut-off valve $V_2$. Upon energization of the heating coil 13, the bimetallic element 12 is deflected downward, as described in detail hereinafter, so that the valve body 16 is separated from the valve seat of the third port 11c to open the first cut-off valve $V_1$ and is engaged with the valve seat of the second port 11b to close the second cut-off valve $V_2$.

In FIG. 4, the mode of operation of the bimetallic element 12 is illustrated in detail. When the main switch S is opened to deenergize the heating coil 13, the bimetallic element 12 stays in its upward position due to the self-biasing force thereof under the biasing of the snap-acting member 17 so that the switch 14 is closed and the valve body 16 is pressed on the valve seat of the third port 11c. Thus, the first cut-off valve $V_1$ is closed to block communication between the first and third ports 11a and 11c, while the second cut-off valve $V_2$ is opened to provide communication between the first and second ports 11a and 11b. In this instance, since the acting points $P_1$, $P_2$ and $P_3$ of the snap-acting member 17 are arranged as shown in (I) of FIG. 4, the snap-acting member 17 urges the bimetallic element 12 upward by the resilient force thereof so that the valve body 16 is securely seated on the valve seat of the third port 11c.

When the main switch S is closed, the heating coil 13 is supplied with electric energy of the power source E mainly across the switch 14. Then, the heating coil 13 is rapidly energized to heat up the bimetallic element 12. Thus, the bimetallic element 12 deflects downward against the resilient force of the snap acting member 17 as shown in (II) of FIG. 4, and subsequently the acting points $P_1$, $P_2$ and $P_3$ of the snap-acting member 17 are aligned on a common plane due to the initial deflection of the bimetallic element 12. This eliminates the upward biasing of the snap-acting member 17 against the bimetallic element 12. Thereafter, the acting points of the snap-acting member 17 are converted in accordance with continuous downward deflection of the bimetallic element 12 so that the snap-acting member 17 urges the bimetallic element 12 downward as shown in (III) of FIG. 4.

This results in opening of the switch 14 and seating of the valve body 16 against the valve seat of the second port 11b. Thus, the second cut-off valve $V_2$ is closed to block the communication between the first and second ports 11a and 11b, while the first cut-off valve $V_1$ is opened to provide communication between the first and third ports 11a and 11c. After opening of the switch 14, the heating coil 13 is continuously energized by the electric energy across the resistor 15, and the bimetallic element 12 is also continuously heated at a predetermined temperature. Thus, the bimetallic element 12 is held in the downward deflected position due to the resilient force of the snap-acting member 17 so as to maintain the seating of the valve body 16 against the valve seat of the second port 11b.

When the main switch S is opened, the heating coil 13 is deenergized so that the bimetallic element 12 is cooled by surrounding air. Thus, the bimetallic element 12 deflects upwardly against the resilient force of the snap-acting member 17 due to the self-returning force thereof as shown in (IV) of FIG. 4, and subsequently the acting points of the snap-acting member 17 are aligned on a common plane due to the upward deflection of the bimetallic element 12. This eliminates the downward biasing of the snap-acting member 17 against the bimetallic element 12. Thereafter, the acting points of the snap-acting member 17 are converted in accordance with continuous upward deflection of the bimetallic element 12 so that the snap-acting member 17 urges the bimetallic element 12 upward as shown in (I) of FIG. 4.

This results in closing of the switch 14 and seating of the valve body 16 against the valve seat of the third port 11c. Thus, the first cut-off valve $V_1$ is closed, while the second cut-off valve $V_2$ is opened to again provide communication between the first and second ports 11a and 11b.

In FIG. 5, there is illustrated a modification of the bimetallic element 12 adapted to the above embodiment. In the figure, the modified bimetallic element 120 is provided thereon with an arcuate slit 12c which performs the same function as that of the snap-acting member 17.

Furthermore, in this embodiment, although the present invention is adapted to the electrothermally-operated valve 10 having the first and second cut-off valves $V_1$ and $V_2$, it should be noted that the present invention may be adapted to an electrothermally-operated valve having only one cut-off valve.

Having now fully set forth both structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. An electrothermally-operated valve comprising:
   a. a housing provided with first, second and third ports and with a hermetic chamber in communication with said ports;
   b. a bimetallic element having a stationary end secured to an inner wall of said housing and a movable end;
   c. cut off valve means including a valve body fixed directly on the movable end of said bimetallic element for selectively closing one of said second and third ports and communicating the other of said second and third ports with said first port;
   d. a heating coil coupled with said bimetallic element and adapted to be connected with a source of electricity;
   e. a normally closed switch means for connecting said heating coil to said source of electricity to energize said heating coil and for disconnecting said heating coil from said source of electricity when said bimetallic element is deflected by the heat generated by said heating coil, said normally closed switch including a fixed contact mounted on an inner wall of said housing and a movable contact mounted on the movable portion of said bimetallic element;
   f. a resistor arranged in parallel with said normally closed switch means for maintaining the electrical connection between said heating coil and said source of electricity after said bimetallic element is deflected and said normally closed switch means is opened, said fixed contact of said normally closed switch means being connected to one end of said resistor and said movable contact of said normally closed switch means being connected to the other end of said resistor; and
   g. means for providing snap-action with said bimetallic element when it is deflected, said means for providing snap-action comprising a first section formed of a U-shaped base spring plate, bowed and fixedly mounted at the stationary end of the bimetallic element and a second section comprising a U-shaped thin spring plate, bowed and secured to said movable portion of the bimetallic element, the legs of said spring plates being opposingly engaged with each other;

whereby, when said bimetallic element is deflected by heat of said heating coil, said cut off valve means selectively opens one of said second and third ports and communicates the other of said second and third ports with said first port through the hermetic chamber of said housing and said snap-action means and said parallel connected resistor maintain said bimetallic element in said deflected position until said source of electricity is disconnected from said resistor.

2. The electrothermally-operated valve set forth in claim 1, further comprising main switch means connected between said source of electricity and said parallel connected heating coil and resistor for selectively restoring said bimetallic element to an undeflected position.

* * * * *